United States Patent [19]

Rawlings

[11] 4,114,742
[45] Sep. 19, 1978

[54] FRICTION CLUTCH COVER ASSEMBLIES

[75] Inventor: Dennis George Rawlings, Leamington Spa, England

[73] Assignee: Automotive Products Limited, Leamington Spa, England

[21] Appl. No.: 768,769

[22] Filed: Feb. 15, 1977

[30] Foreign Application Priority Data

Feb. 17, 1976 [GB] United Kingdom ............... 06087/76

[51] Int. Cl.² ............................................. F16D 13/54
[52] U.S. Cl. ................................... 192/89 B; 192/70.3
[58] Field of Search ................... 192/89 B, 70.29, 70.3

[56] References Cited

U.S. PATENT DOCUMENTS

| 2,813,607 | 11/1957 | Haussermann | 192/89 B X |
| 3,213,991 | 10/1965 | Smirl et al. | 192/89 B X |
| 3,417,846 | 12/1968 | Cook | 192/89 B X |

FOREIGN PATENT DOCUMENTS

| 1,475,407 | 4/1969 | Fed. Rep. of Germany | 192/70.29 |
| 1,250,948 | 10/1971 | United Kingdom | 192/70.3 |

Primary Examiner—Benjamin W. Wyche
Attorney, Agent, or Firm—Kemon & Estabrook

[57] ABSTRACT

A clutch cover assembly for a diaphragm spring friction clutch has a generally annular clutch cover with a plurality of circumferentially arranged holes in the cover, a diaphragm spring attached to the clutch cover and having an annular portion and a plurality of inwardly projecting spring fingers integral therewith, and a pressure plate secured to the cover so that the diaphragm spring is interposed between the cover and the pressure plate. The diaphragm spring is attached to the clutch cover by a plurality of individual wire members each of which passes through two of the plurality of circumferentially arranged holes in the cover and encompasses one finger of the diaphragm spring and a portion of the cover.

6 Claims, 7 Drawing Figures

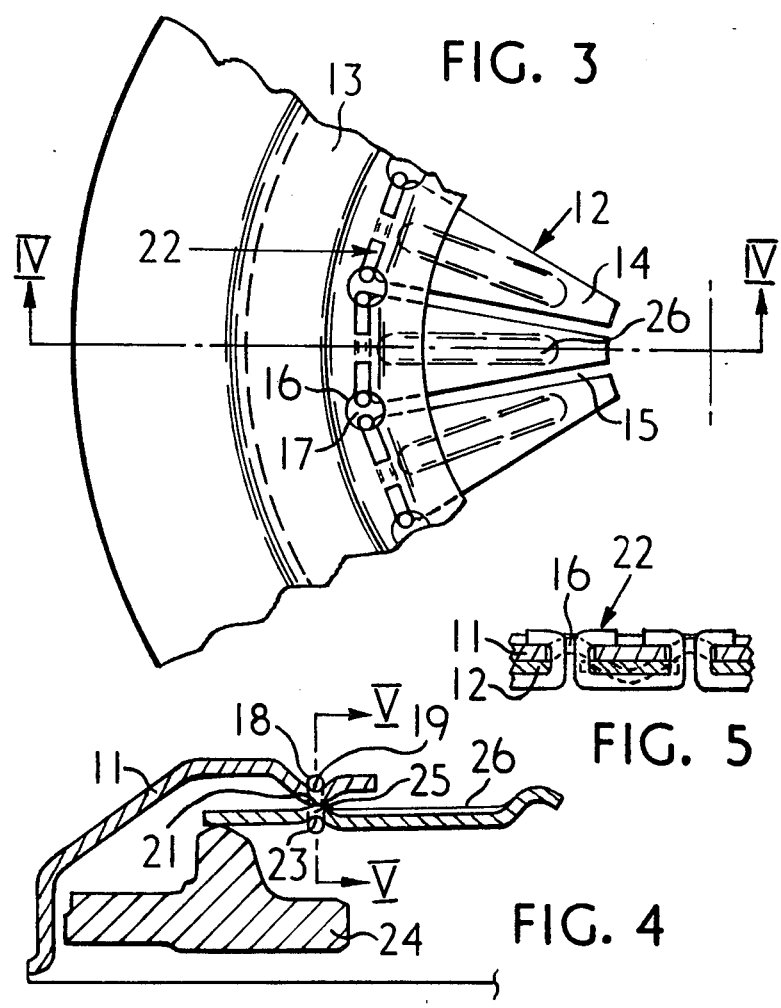
FIG. 3
FIG. 4
FIG. 5
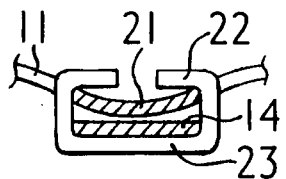
FIG. 6
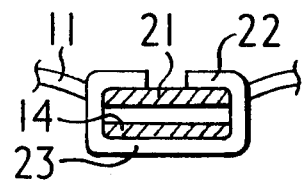
FIG. 7

FRICTION CLUTCH COVER ASSEMBLIES

The invention relates to diaphragm spring friction clutches and more particularly to clutch cover assemblies for such friction clutches.

A diaphragm spring clutch, already known, includes a diaphragm spring with an annular frusto-conical portion integral with a plurality of inwardly projecting spring fingers which are symmetrically distributed around the inner perimeter of the frusto-conical portion. When pressure is applied on the inner circumference, formed by the ends of the projecting fingers, the spring lifts a pressure plate with its outer edge thus releasing the clutch.

In some known clutches of this construction the spring is supported on a clutch cover at a number of separate points with the aid of rivets, bolts, or similar means, such supports are all an equal radial distance from the centre of the spring so as to provide fulcra for the lever movement of the individual fingers of the spring. Such a construction is known as a clutch cover assembly.

An object of the present invention is to produce a clutch cover assembly provided with a new means for securing the diaphragm spring to the clutch cover which also provides fulcra for movement of the diaphragm spring relative to the clutch cover.

Broadly one aspect of this invention is a friction clutch cover assembly comprising a substantially annular clutch cover, a pressure plate, and a diaphragm spring, wherein the spring is supported to the cover and is fulcrumed for movement relative to the clutch cover by individual wire members, each of which passes through two of a plurality of circumferentially arranged holes in the cover and wraps around a finger of the diaphragm spring and a part of the cover.

Preferably an individual wire member supports each finger and preferably each wire member extends through two holes in the cover, the end portions of the wire are bent over to lie adjacent the cover so that the wire member forms an incomplete generally rectangular ring.

Preferably the holes in the cover through which the support wires pass are aligned with the spaces between the individual fingers of the spring.

Also, it is preferable for the holes in the cover to be located at the bottom of an annular groove which runs around the inner perimeter of the cover on the side of the cover away from the spring, and a raised rib complementary to the groove on the side of the cover adjacent the spring provides a fulcrum for the spring.

The wire ring may be formed around the finger and the clutch cover by passing the wire through the two holes in the cover, from the spring side of the cover, such that the complete side of the wire ring lies against the finger and holds the finger hard fast against the peak of the rib on the cover, the incomplete side of said ring being located in the groove on the cover.

The support wire may pass around the finger at its base next to the annular portion of the diaphragm spring.

Preferably the side of the diaphragm spring adjacent the cover is provided with an annular rib aligned with the rib of the cover, so that the complete side of the wire ring is located on the side of the diaphragm spring away from the cover in an annular groove which is complimentary with the annular rib on the diaphragm spring.

Three embodiments of this invention will be described now by way of example only with reference to the accompanying drawings of which:

FIG. 3 is a perspective view of a fragment of another form of cover assembly according to this invention;

FIG. 4 is a section on the line IV—IV of FIG. 3;

FIG. 5 is a section on the line V—V of FIG. 4;

FIG. 6 is a similar section to FIG. 5 showing a modified cover at rest;

FIG. 7 is a section on a modified cover when the load is applied.

Figure 1:
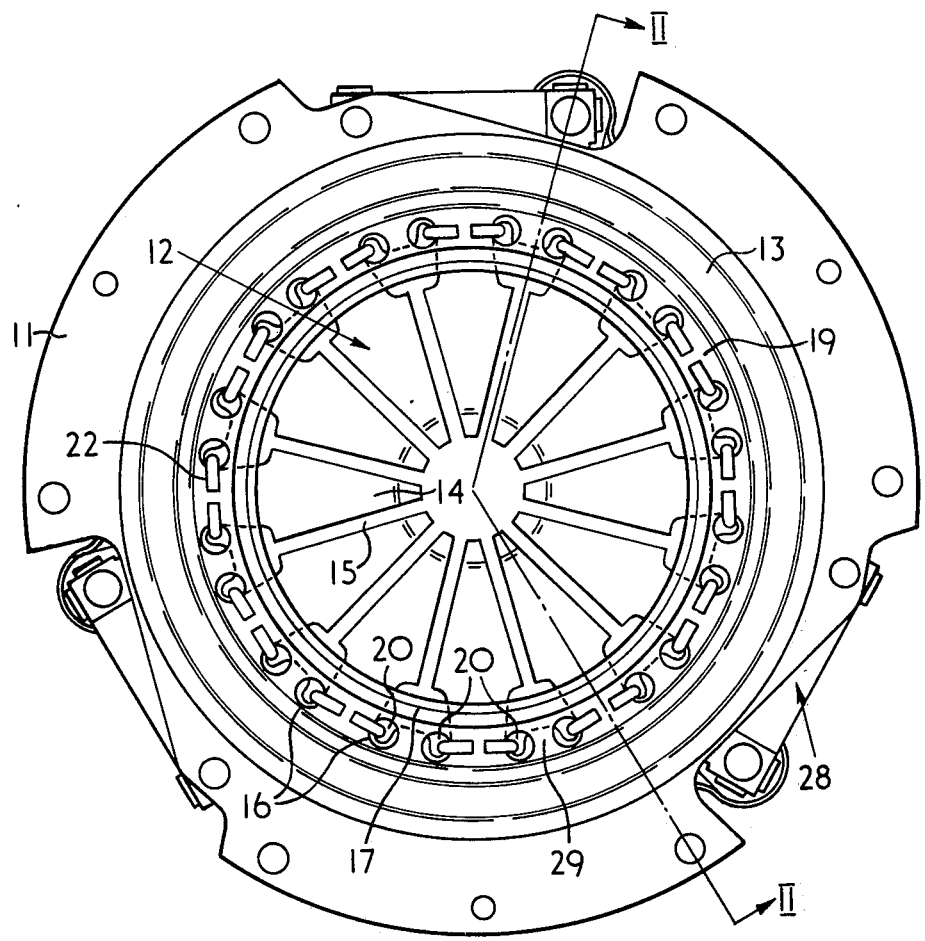
FIG. 1 is a perspective view of one form of cover assembly according to this invention.
Figure 2:
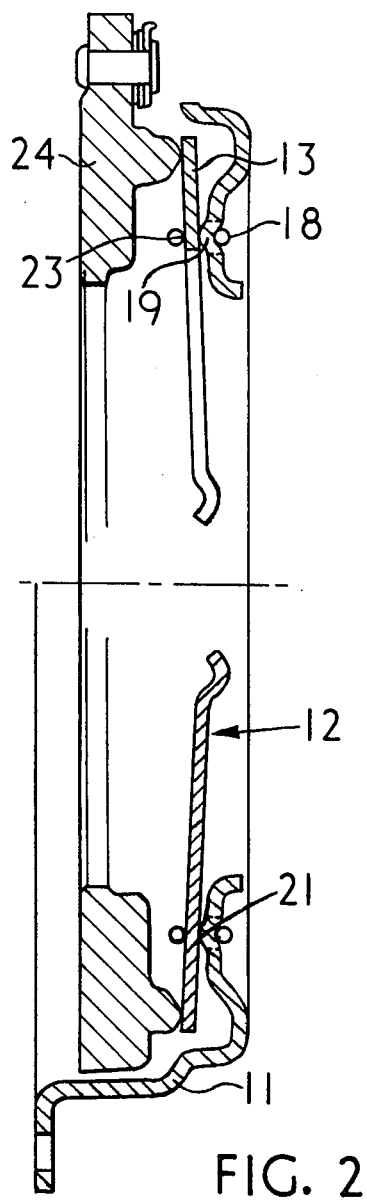
FIG. 2 is a section on the line II—II of FIG. 1.

Referring to FIGS. 1 and 2 of the drawings, a sheet, steel diaphragm spring 12 comprises a continuous annular portion 13 and a plurality of inwardly projecting spring fingers 14 which are symmetrically spaced around the inner perimeter of the continuous annulus. The diaphragm spring 12 is supported to the clutch cover 11 by a number of incomplete wire rings 22 and held hard fast against the pivot 21, provided by the bottom of the annular groove 19 which runs around the inner perimeter of the clutch cover 11 on the side of the cover away from the spring. The wire rings 22 support the diaphragm spring 12 against an annular pivot fulcrum at the base of the fingers 14, a suitable position being provided by apertures 17 located at the radially outer end of the slots 15 between the fingers 14.

The apertures 17 are substantially trapezoid in shape and each aperture 17 has an internal radial projection 29 from its radially outer edge which projects into the aperture 17 for a distance which is slightly greater than the diameter of the wire 18. This projection 29 forms two inlets 20 of the aperture 17 which lie either side of the projection 29 on the radially outer edge of the aperture 17. The apertures 17 at the base of the fingers align with holes 16 in the cover 11, and the wire 18 passes around the side of a finger 14 away from the cover 11, through the inlets 20 of the apertures 17 at the base of and either side of a finger 14, through the holes 16 in the cover 11, which align with the inlets 20 of the apertures 17, and the wire 18 is then bent back across said finger 14 to form an incomplete wire ring 22. The wire ring 22 then provides a support and a fulcrum 23 on the side of the diaphragm spring nearest the flywheel. (Not shown). The wire ring 22 lies in the groove 19 and its position is thereby fixed. The incomplete wire rings 22, which have been referred to herein above, are easily formed as staples which are well known in other arts but not in as thick a guage of wire as is contemplated for use in forming said rings.

A pressure plate 24 is attached to the cover 11 by three drive straps 28 which allow the pressure plate to move axially with respect to the clutch cover and diaphragm spring, but lock the pressure plate 24 against relative rotational movement with the clutch cover 11 and hence the flywheel (not shown).

When a pressure is applied to the radially inner end of the finger 14, the diaphragm spring fulcrums about the fulcrum support 23 and moves the fulcrum support 23 away from the pivot 21 formed in the clutch cover, such that the finger 14 is no longer in contact with the pivot 21. The fulcrum support 23 is now free to swing in an arc, subtended by the length of the sides of the wire rectangular ring, pivoting about the fulcrum formed by the annular groove in the cover. The outer edge 13 of the diaphragm spring moves away from the flywheel. The clutch cover 11, is attached directly to the flywheel, thus when the outer edge 13 of the diaphragm spring moves away from the flywheel, taking the clutch pressure plate 24 with it, this releases the clutch driven plate from between the flywheel and the pressure plate.

When the pressure on the radially inner ends of the fingers is removed the diaphragm spring lifts off the fulcrum support 23 and contacts the pivot 21. Further movement of the radially inner end of the finger causes the finger to roll around the pivot 21.

This reduces scuffing and bearing friction. The best rolling action is given by an annular groove which conforms to a radius struck from the centre of rotation of the supporting member.

A further embodiment of this invention is shown in FIGS. 3, 4 and 5. The diaphragm spring 12 has been modified to provide each finger 14 with an annular rib 25 and a radial rib 26 extending centrally therein from a position adjacent the annular rib 25 to the radially inner portion of each finger. The radially extending rib 26 is a reinforcing rib and counters the tendency for the finger to bend during operation. The annular rib 25 provides a pivot point on the diaphragm spring and also provides a complimentary annular depression 27, on the side of the spring nearest the flywheel, which when aligned with the groove 19 provides a more positively fixed position for the wire ring 22.

Although the diaphragm spring has been modified the general description and workings of this cover assembly are as for FIG. 1 and FIG. 2.

However the existance of a radial pivot 25 on the diaphragm spring allows a more perfect rolling action after the diaphragm spring contacts pivot 21, when the pressure is taken off the radially inner ends of the fingers. This gives a practically friction free bearing with a minimum of scuffing to the surfaces.

FIGS. 6 and 7 shows a cover which has been modified to provide a return spring for the finger when the pressure is released.

When the load is applied to the radially inner end of the finger, this lifts the diaphragm spring away from the pivot 21. The pivot has a shallow concave shape, so that the upper corners of the wire quadralateral are adjacent the high points on the concave pivot. Thus when the finger lifts away from the pivot 21 the load on the fulcrum 23, transmitted through the wire member 22, straightens the pivot 21.

This then acts as a return spring to help to remove excess strain from the wire members.

I claim:

1. A clutch cover assembly comprising a clutch cover of a generally annular configuration; a plurality of holes circumferentially arranged in the cover; a diaphragm spring attached to the cover and having an annular frusto-conical portion and a plurality of inwardly spaced projecting spring fingers integral therewith; a pressure plate secured to the cover so that the diaphragm spring is interposed between the pressure plate and the cover; a plurality of individual wire members each of which consists of a length of wire formed into a substantially closed rectangular ring and passes through adjacent holes in the cover so as to tightly embrace and axially clamp together one finger of the diaphragm spring and a portion of the cover between said adjacent holes and a portion of said ring lies against the side of the finger away from the cover so as to provide a fulcrum for the movement of the finger relative to the cover.

2. A clutch cover assembly according to claim 1 wherein an individual wire member encompasses each finger of the diaphragm spring.

3. A clutch cover assembly according to claim 2 wherein the plurality of circumferentially arranged holes are arranged so that the holes are aligned with spaces between the spring fingers.

4. A clutch cover assembly according to claim 1 including an annular groove in one side of the cover away from the diaphragm spring and a complementary annular rib on the second side of the cover adjacent the diaphragm spring, wherein the plurality of circumferentially arranged holes are located in the annular groove in said one side of the cover and the annular groove runs around the inner perimeter of the cover and the complementary annular rib on the second side of the cover acts as a pivot for the diaphragm spring.

5. A clutch cover assembly according to claim 4 wherein the substantially closed rectangular rings are arranged so that the incomplete side of the ring is located in the annular groove on said one side of the cover.

6. A clutch cover assembly according to claim 5 wherein the diaphragm spring is also provided with an annular rib on the side of the spring adjacent the cover which has a complementary groove on the side of the spring away from the cover and the annular rib on the spring is aligned with the annular rib on the second side of the cover, and the rectangular wire rings are located in the angular groove on said one side of the cover and the aligning groove on the diaphragm spring.

* * * * *